Patented Aug. 18, 1936

2,051,505

UNITED STATES PATENT OFFICE 2,051,505

PROCESS OF SOLIDIFYING SOILS

Jan van Hulst, Amsterdam, Netherlands, assignor to The Patent and Licensing Corporation, Boston, Mass., a corporation of Massachusetts No Drawing. Application November 26, 1935, Serial No. 51,602. In the Netherlands January 8, 1935

9 Claims. (Cl. 61—36)

In my co-pending application, filed April 26, 1933, Serial No. 668,033, which is a continuation-in-part of my application filed October 24, 1932, Ser. No. 639,505, I have described a process for making layers, screens or masses impermeable or substantially impermeable to water or gases in porous and pervious soils, such as sand soils or sand masses, in porous masonry and other stony materials, and/or fixing loose or mobile soils.

The process according to said application essentially consists in that an aqueous dispersion of bituminous substances is caused to penetrate into the soil or mass to be treated, and to coagulate at the desired place or at the required depth, so as to produce a firm layer, which is impermeable or substantially impermeable to water and/or gases. In said application it is pointed out that the previous presence of electrolytes in the soil or other mass may affect the coagulation of the dispersion, thus making it necessary or advantageous to reduce the concentration of these substances in the soil, which can be done by previous application of pure water or a solution of inversely acting agents, e. g. of coagulation-hindering substances, such as an alkaline solution. On the other hand, electrolyte solutions or in general coagulation-promoting agents may be applied before, during or after the introduction of the dispersion, in order to produce a proper coagulation of the latter at the required place.

In carrying out the process according to the said application it was found that the previous application of water, or of coagulation-hindering or coagulation-promoting agents did not always produce the desired effect. Thus, for example, the previous washing away of the electrolytes present in the mass to be impermeabilized with pure water or with a solution of inversely acting agents will not always warrant that the bitumen dispersion does not coagulate before a sufficient quantity thereof has been introduced into the mass under treatment, since, for instance, many bitumen dispersions already flocculate on dilution with water.

The coagulation of the bitumen dispersions thus being dependent both on their composition and on the coagulating influences present in the mass to be tightened, these various factors should be effectively controlled with a view to a proper coagulation.

I have now found that it may be preferable to use, instead of pure water or solutions of coagulation-hindering or coagulation-promoting agents, a bitumen dispersion which is more stable than the dispersion which by coagulation is to bring about the tightening of the voids of the mass to be treated, for example when there is a chance of the dispersion being diluted or carried away by the ground water streams during or after its introduction into the ground mass to be tightened.

The process according to my present invention consists in first introducing into the soil or other mass to be tightened a stabilized bitumen dispersion which does not coagulate during its penetration and subsequently a bitumen dispersion of less stability or having a greater tendency to coagulate, the latter dispersion being caused to coagulate at the desired place, if desired in such a manner that coagulation already sets in during the introduction.

By the previous application of a highly stable bitumen dispersion which is resistant to the action of the components of the mass to be tightened and of the dissolved or soluble substances contained therein, the said mass is brought into such a condition that it will not cause the less stable dispersions subsequently applied to coagulate prematurely.

In such a successive application of different bitumen dispersions the first dispersion is displaced by the second, without any appreciable mixing of the two.

Since there is some chance that it will be impossible to introduce the required quantity of the less stable dispersion into the mass treated if, after the injection of the stable dispersion, a dispersion of very low stability or having a great tendency to coagulate is injected, it may be recommendable to apply dispersions of gradually or stepwise decreasing stability or increasing tendency to coagulate. As also the most stable dispersions applied in the process may be made to coagulate after a certain time, it will be possible to carry out the process so that the dispersions first introduced will by their subsequent coagulation complete the partial impermeabilization previously produced by the coagulation of the less stable dispersion.

If desired, filling substances promoting the tightening of the voids of the mass treated in combination with the coagulated bitumen, such as the colloidal or other fillers described in the co-pending application filed June 5, 1935, Ser. No. 25,184, for instance, a clay suspension, may be added to one or more of the bitumen dispersions used in the present process, preferably to the less stable dispersion or dispersions.

I have also described in the above-mentioned application Ser. No. 668,033 that it may be advantageous to screen the bitumen dispersion or to filter it through a layer of the same material as that which it will subsequently have to penetrate, such with a view to preventing premature clogging of the mass to be tightened owing to the presence of particles in the dispersion which are too coarse for readily penetrating into the said mass.

However, the screening or filtering of a dispersion is all the more difficult as the dispersion is less stable. With equal amounts of coarse particles present a filter will be clogged up sooner in the case of an unstable dispersion than in the case of a stable dispersion.

Now, the pre-filtration of the bitumen dispersion may be successfully combined with the process according to the present invention.

In applying the said process it is essential that the less stable dispersion, before coagulating, shall be able to cover the same stretch as the preceding, more stable dispersion. This will be easier according as the percentage of coarse particles in the more stable dispersion is smaller, since in that case there will be less clogging of the voids of the mass to be tightened due to said stable dispersion. If the less stable dispersion which is subsequently applied contains such a percentage of coarse material that premature clogging is to be feared, this danger may be obviated by previously freeing the more stable dispersion of a sufficient amount of coarser particles. When operating in this way the less stable dispersion need not necessarily be filtered, or may be filtered through a coarser filter, the risk of clogging of the filter thus being avoided or reduced.

Filter materials of any kind may, of course, be used, provided that they produce sufficient elimination of the coarse particles from the dispersion.

It will not always be necessary to effect a thorough filtration of the more stable dispersion; for example, if it contains only a small amount of coarse particles, or if a small amount of said dispersion is applied, it will be possible to omit the filtration or to filter only a portion of the dispersion or to use a coarser filter than that corresponding to the material to be treated with the dispersion.

Example I

A subsoil layer of about 50 cm. thickness, consisting of coarse sand and gravel, is waterproofed in the following manner:

At regular distances of about 1 m. pipes are drilled into the ground until the said subsoil layer has been reached. Into each pipe there is first introduced approximately 20 l. of a stable dispersion, which is prepared by dispersing one part by weight of bitumen (penetration 300 at 25° C., measured according to the A. S. T. M. method) in two parts by weight of a 0.5% soap solution, after which 1% of casein, calculated on the weight of bitumen, is added for stabilization. After the injection of this dispersion 200 l. of a bitumen dispersion prepared in the same manner but without the addition of casein is introduced through each pipe. The dispersions may be simply poured into the pipes and allowed to penetrate into the ground by gravity, it being in general unnecessary to apply pressure by pumping or otherwise.

Example II

A subsoil layer consisting of fine sand, traversed by a ground water stream, is treated as follows:

Through a series of pipes drilled in at regular intervals of about 2 m. there is successively introduced:

(1) 500 l. of the bitumen dispersion as mentioned in Example I, stabilized with 1% of casein and moreover admixed with 1% of methyl formate, both percentages calculated on the weight of bitumen;

(2) 500 l. of the same bitumen dispersion as mentioned (sub 1), stabilized with 0.7% of casein;

(3) 500 l. of the same bitumen dispersion as mentioned (sub 1) stabilized with 0.5% of casein;

(4) 1200 l. or more of dispersion as mentioned (sub 1), stabilized with 0.3% of casein, the injection of the latter dispersion being continued until impermeabilization has been obtained.

Example III

A sandy ground essentially consisting of fine sand is fixed and waterproofed as follows:

A series of pipes, set up triangularly at equal distances, is driven into the ground to the desired depth. Into each pipe is first poured a suitable amount of a 30% dispersion prepared by dispersing bitumen of penetration 100 at 25° C. in a 0.5% soap solution and thereupon adding 2% of casein for stabilization, said dispersion having first been filtered through a layer approximately 10 cm. thick of the same sand into which the dispersion has to be injected. Subsequently a bitumen dispersion prepared in the same manner, to which has been added only 0.5% of casein and which has been filtered through a layer of very fine gravel, is introduced into the ground. The coagulation of both dispersions is produced at the required place in consequence of the coagulating action of the soil constituents and the ground water.

What I claim is:

1. A process for making impervious, tightening or fixing pervious or loose subsoil layers, such as sand soils and other porous masses by causing an aqueous dispersion of a bituminous substance to penetrate into the mass to be treated and to coagulate therein, which comprises first introducing into the mass to be treated a stabilized bitumen dispersion which does not coagulate during its penetration, and subsequently a bitumen dispersion of less stability or having a greater tendency to coagulate at the desired place.

2. A process as claimed in claim 1, in which a series of bitumen dispersions of gradually or stepwise decreasing stability or increasing tendency to coagulate are caused to penetrate successively into the mass to be treated.

3. A process as claimed in claim 1, in which the bitumen dispersions to be applied in the said process are previously freed from the coarse particles of bitumen which would prematurely clog the mass to be treated.

4. A process as claimed in claim 1, in which the bitumen dispersions to be applied in the said process are previously filtered through a layer of the same material as that constituting the mass to be treated.

5. A process as claimed in claim 1, in which only the more stable bitumen dispersion to be applied first in the said process is previously filtered through a layer of the same material as that constituting the mass to be treated.

6. A process as claimed in claim 1, in which the bitumen dispersions of gradually or stepwise decreasing stability or increasing tendency to coagulate are filtered prior to their application to the mass to be treated, through filters of increasing width of mesh.

7. A process as claimed in claim 1, in which the last introduced, less stable bitumen dispersion only produces a partial impermeabilization of the mass under treatment, which impermeabilization effect is completed by the subsequent coagulation of previously introduced, more stable dispersion.

8. A process as claimed in claim 1, in which filling substances are added to one or more of the bitumen dispersions used for successive application in the process.

9. A process as claimed in claim 1, in which use is made first of one or more relatively stable bitumen dispersions without filling substances, and thereafter of one or more less stable bitumen dispersions with filling substances.

JAN van HULST.